United States Patent [19]

Prue

[11] 4,138,152
[45] Feb. 6, 1979

[54] STORAGE BOX BUMPER ASSEMBLY FOR VEHICLES

[76] Inventor: Oscar Prue, 6330 Buchanan St., Hollywood, Fla. 33024

[21] Appl. No.: 844,798

[22] Filed: Oct. 25, 1977

[51] Int. Cl.² .................... B60R 19/00; B60R 21/14; B61F 19/04
[52] U.S. Cl. ........................... 293/117; 224/42.03 A; 293/118
[58] Field of Search ............... 293/60, 63, 69 R, 98, 293/99, 73; 224/42.03 R, 42.03 A, 42.04, 42.05, 42.06

[56] References Cited

U.S. PATENT DOCUMENTS

| | | | |
|---|---|---|---|
| 3,588,160 | 6/1971 | Reiner | 293/69 R |
| 3,606,385 | 9/1971 | Johannes | 224/42.03 A |
| 3,614,136 | 10/1971 | Dent | 224/42.04 |
| 3,682,360 | 8/1972 | Fletcher | 224/42.05 |
| 3,785,541 | 1/1974 | Sibley | 293/69 R |

Primary Examiner—Trygve M. Blix
Assistant Examiner—D. W. Keen

[57] ABSTRACT

A storage box bumper assembly comprising floor, rear wall, front wall and top portions forming a vehicle bumper having a chamber therein, the top portion being hingedly mounted for opening and closing the chamber, and two frame members connected to the bumper and extending outwardly therefrom, the frame members being adapted for attachment to a frame portion of the vehicle.

2 Claims, 5 Drawing Figures

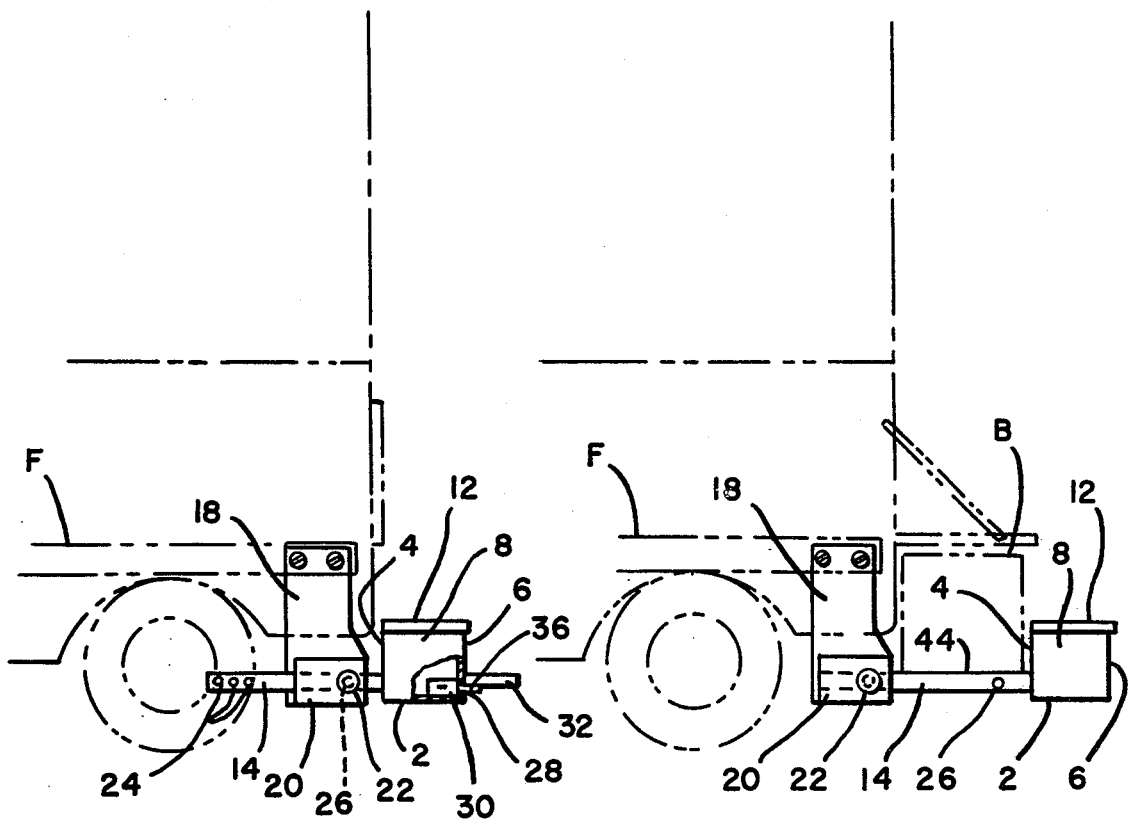
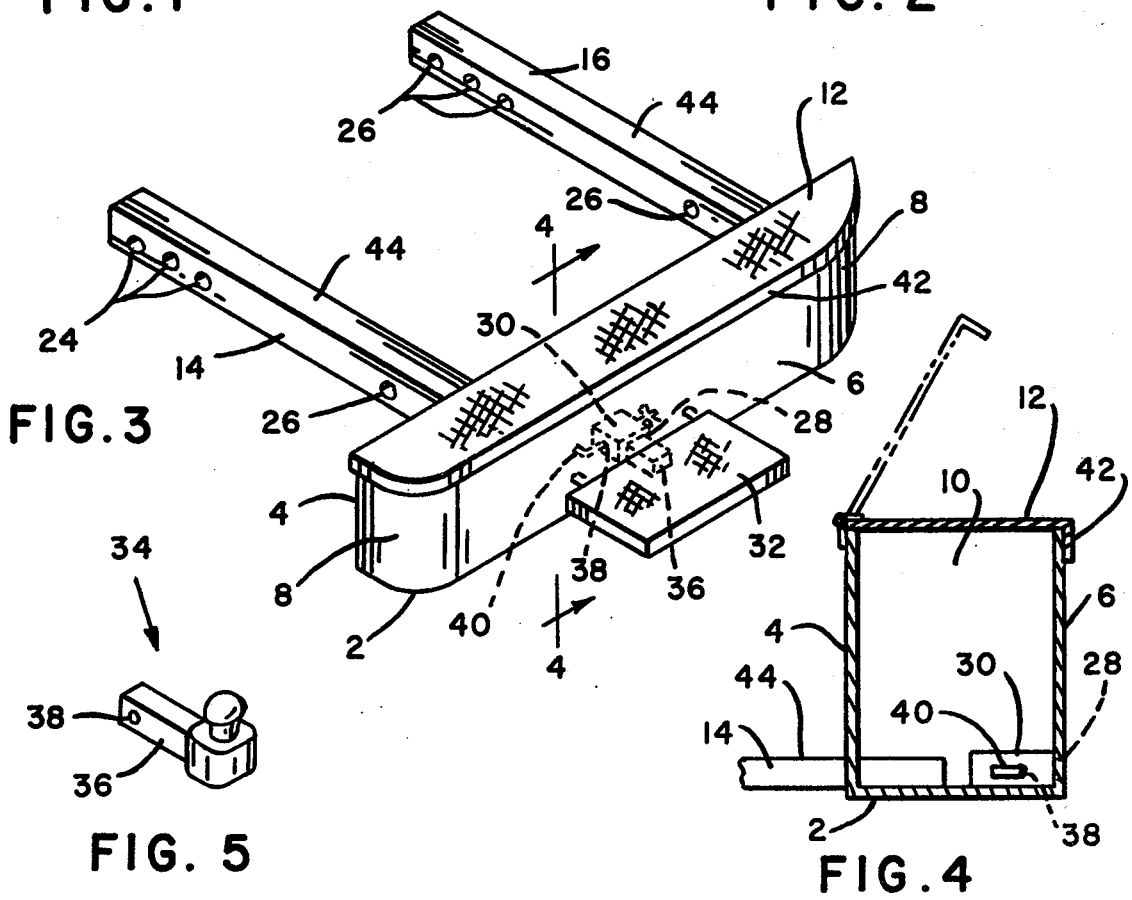

STORAGE BOX BUMPER ASSEMBLY FOR VEHICLES

BACKGROUND OF THE INVENTION

FIELD OF THE INVENTION

This invention relates to storage facilities for vehicles and is directed more particularly to a bumper assembly adapted to act as a storage box, as well as a bumper.

SUMMARY OF THE INVENTION

An object of the present invention is to provide a storage box bumper assembly having facility for acting as a conventional bumper and having the additional facility of acting as a storage compartment.

A further object of the invention is to provide such a device as may be selectively positioned on the frame of a vehicle.

A still further object of the invention is to provide such a device as is adapted to receive and retain attachments, such as step means, or trailer towing means.

A still further object of the invention is to provide such a device as is relatively simple and inexpensive to manufacture and easy and convenient to use.

With the above and other objects in view, as will hereinafter appear, a feature of the present invention is the provision of a storage box bumper assembly for vehicles comprising an elongated floor portion, a rear wall portion upstanding from the floor portion, a front wall portion upstanding from the floor portion, the front wall portion extending rearwardly at either end thereof to join the rear wall portion forming a chamber between the front and rear wall portions, a top portion hingedly mounted and adapted to overlie the chamber, and first and second frame members, each frame member comprising a rigid elongated rod, a portion of the rod proximate a first end thereof being connected to a surface of the floor portion, the rod extending outwardly from the rear wall portion substantially normal thereto, the frame members extending substantially parallel to each other and being of substantially equal length, the frame members being adapted for attachment to a frame portion of the vehicle.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

FIG. 1 is a side elevational view, partly broken away, showing the assembly in use;

FIG. 2 is a side elevational view, similar to FIG. 1, but showing the device in use in a different position;

FIG. 3 is a perspective view of a portion of the assembly, enlarged for clarity;

FIG. 4 is a sectional view taken along line IV-IV of FIG. 3; and

FIG. 5 is a perspective view of one form of attachment suitable for use with the assembly.

DESCRIPTION OF THE PREFERRED EMBODIMENT

Referring to the drawings, it will be seen that the illustrative assembly includes a floor portion 2, a rear wall portion 4 upstanding from the floor portion 2 and a front wall portion 6 upstanding from the floor portion 2. The front wall portion 2 extends rearwardly at either end 8 thereof to join the rear wall portion 4, forming a chamber 10 therebetween. A top portion 12 is hingedly mounted on the assembly, preferably on the rear wall portion 4 and is movable from a closed position as shown in solid lines in FIG. 4 to an open position as shown in phantom in FIG. 4. In the closed position, the top portion 12 overlies the chamber 10, effecting closure thereof.

First and second frame members 14, 16 comprise rigid elongated rods, a portion of each rod proximate a first end thereof being connected to the floor portion 2. The rods 14, 16 extend outwardly from the rear wall portion 4 substantially normal thereto. The rods extend substantially parallel to each other and are of substantially equal length.

The assembly includes a pair of bolt plates 18 adapted to be bolted to a vehicle frame portion F. Each bolt plate 18 is provided with a box 20 thereon, the box 20 being adapted to slidingly receive one of the frame members 14, 16. The boxes 20 are provided with lock means 22 for fixing the frame members 14, 16 in the box 20 at a selected position, as will be further described below.

The frame members 14, 16 are each provided with a plurality of lock holes 24, 26, each lock hole 24, 26 being alignable with a similar hole disposed in the boxes 20, the aligned holes being adapted to receive the lock means 22 in the form of a conventional locking pin. It will be apparent from the drawings, that selection of the lock holes 26 will ensure that the bumper assembly is close by the rear of the vehicle, while selection of any of the holes 24 will displace the bumper rearwardly of the vehicle (as shown in FIG. 2) to provide additional space between the bumper and the rear of the vehicle for placement of boxes, chests, camping equipment, or the like.

The front wall portion 6 may be provided with an opening 28 and the chamber 10 may be provided with a housing 30 having an open end in alignment with and proximate to the opening 28, the housing being adapted to receive and releasably retain attachment means, such as the step means 32 shown in FIGS. 1 and 3 and the trailer towing hitch means 34 shown in FIG. 5. The step means 32 and the towing hitch means 34 are each provided with a projection 36 having a lock hole 38 therein, the lock hole 38 being alignable with a similar hole in the housing 30 to receive a locking pin 40 to secure the attachment to the assembly. Thus, in addition to providing bumper facility and a storage facility, the assembly includes means for attachment of a step or a trailer towing hitch thereto.

Preferably, the top portion 12 is provided with a downwardly extending flange 42 (FIGS. 3 and 4) on the front and end portions thereof, the flange being adapted to overhang the front wall portion 6 to provide weatherproofing for the chamber 10.

It is preferred that the frame members 14, 16 be provided with flat upper surfaces 44 to facilitate receipt of additional equipment or gear B as shown in FIG. 2.

While the frame members may be joined to the under surface of the floor portion 2, in the embodiment described the frame members 14, 16 are secured to an upper surface of the floor portion 2 and extend through openings in the rear wall portion 4. For further rigidity the frame members 14, 16 are connected at ends thereof to the front wall portion 6.

To be used, the bolt plates 18 are attached to the vehicle frame members F in a substantially permanent fashion. That is to say, it is envisioned that the bolt plates 18 would remain on the frame F and not be removed between uses. To prepare for a camping trip, or the like, the frame member 14, 16 would be positioned in the bolt plate boxes 20 so as to align the selected frame member holes 24, 26 with the complementary hole of the box 20. A locking pin 22 is then inserted to retain the bumper in the position selected. If the extended position (FIG. 2) is selected, gear may be placed on the upper surfaces 44 of the extended frame members as well as in the chamber 10 of the bumper assembly. If it is desired that a trailer be towed, the towing hitch means 34 may be connected to the assembly by way of insertion of the projection 36 through the opening 28 into the housing 30. Insertion of the locking pin 40 into the lock hole 38 and the complementary hole in the housing 30 ensures secure attachment of the towing means. If desired, upon arrival at a camping site, or the like, the towing hitch 34 may be removed and replaced with a step means 32, the step means being attached to the assembly in the same manner as the towing hitch.

It is to be understood that the present invention is by no means limited to the particular construction herein disclosed and/or shown in the drawings, but also comprises any modifications or equivalents within the scope of the disclosure.

Having thus described my invention what I claim as new and desire to secure by Letters Patent of the United States is:

1. A storage box bumper assembly for vehicles comprising an elongated floor portion, a rear wall portion upstanding from said floor portion, a front wall portion upstanding from said floor portion, said front wall portion extending rearwardly at either end thereof to join said rear wall portion forming a chamber on said floor portion between said front and rear wall portions, a top portion hingedly mounted on one of said wall portions and adapted to overlie said chamber and enclose said chamber, and first and second frame members, each of said frame members comprising a rigid elongated rod, a bottom portion of said rod proximate a first end thereof being connected to an upper surface of said floor portion, said rod extending through and outwardly from said rear wall portion substantially normal thereto, said frame members extending substantially parallel to each other and being of substantially equal length, a pair of distinct and separate bolt plates for attachment to frame portions of said vehicle on either side of said vehicle, each bolt plate having a box thereon, each of said boxes being adapted to receive one of said frame members, and lock means for fixing said frame member in said box, said lock means comprising holes in said box and a lock pin adapted to enter and be retained in said box holes, a plurality of holes in said frame member proximate a free end of said frame member and at least one hole in said frame member proximate said rear wall, said frame holes being selectively alignable with said box holes and said lock pin being operative to engage a selected one of said frame holes and said box holes to lock said frame member to said box.

2. The invention according to claim 1 in which said assembly includes an opening in said front wall portion and a housing disposed in said chamber with an open end in alignment with and proxmiate to said opening, said housing being adapted to receive and releasably retain projection means, a towing hitch means comprising a ball connector portion disposed on a body portion, and a first of said projection means extending from said body portion, and a step means comprising a platform portion having a second of said projection means fixed thereto and extending therefrom, said towing hitch means and said step means being selectively and interchangebly attachable to and removed from said housing.

* * * * *